US012623182B2

(12) United States Patent
Matsumoto et al.

(10) Patent No.: US 12,623,182 B2
(45) Date of Patent: May 12, 2026

(54) FILTER FOR REMOVING RADIOACTIVE NOBLE GAS, FILTER UNIT AND REACTOR CONTAINMENT VENT SYSTEM

(71) Applicant: Hitachi GE Vernova Nuclear Energy, Ltd., Hitachi (JP)

(72) Inventors: Shigenori Matsumoto, Tokyo (JP); Atsuko Ueda, Tokyo (JP); Takahisa Matsuzaki, Tokyo (JP)

(73) Assignee: HITACHI GE VERNOVA NUCLEAR ENERGY, LTD., Ibaraki (JP)

( * ) Notice: Subject to any disclaimer, the term of this patent is extended or adjusted under 35 U.S.C. 154(b) by 744 days.

(21) Appl. No.: 18/010,231

(22) PCT Filed: Jun. 8, 2021

(86) PCT No.: PCT/JP2021/021705
§ 371 (c)(1),
(2) Date: Dec. 14, 2022

(87) PCT Pub. No.: WO2022/009587
PCT Pub. Date: Jan. 13, 2022

(65) Prior Publication Data

US 2023/0311058 A1 Oct. 5, 2023

(30) Foreign Application Priority Data

Jul. 7, 2020 (JP) ................................ 2020-116905

(51) Int. Cl.
*B01D 53/22* (2006.01)
*B01D 71/64* (2006.01)
(Continued)

(52) U.S. Cl.
CPC ........... *B01D 53/228* (2013.01); *B01D 71/64* (2013.01); *G21F 9/02* (2013.01);
(Continued)

(58) Field of Classification Search
CPC .................. B01D 53/228; B01D 71/64; B01D 2053/222; B01D 2053/224; G21F 9/02; G21C 9/004; G21C 13/022
See application file for complete search history.

(56) References Cited

U.S. PATENT DOCUMENTS

2011/0203314 A1* 8/2011 Mak .................. B01D 53/1475 96/242
2015/0174530 A1* 6/2015 Murai ................ B01D 53/1493 423/210
(Continued)

FOREIGN PATENT DOCUMENTS

JP 2018-179693 A 11/2018
WO WO-2017060863 A1 * 4/2017 ......... C08G 73/1067

OTHER PUBLICATIONS

Atomic Radius for all the elements in the Periodic Table, https://periodictable.com/Properties/A/AtomicRadius.v.html, retrieved Oct. 20, 2025, 2 pages (Year: 2025).*
(Continued)

*Primary Examiner* — Anthony Shumate
(74) *Attorney, Agent, or Firm* — MATTINGLY & MALUR, PC

(57) ABSTRACT

A radioactive noble gas removal filter, a filter unit, and a nuclear reactor containment vessel vent system with improved durability are provided. The radioactive noble gas
(Continued)

removal filter according to the present invention includes a polyimide film including a structural unit represented by general formula (1).

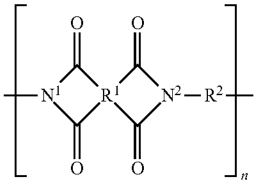

(1)

20 Claims, 2 Drawing Sheets

(51) Int. Cl.
*G21F 9/02* (2006.01)
*G21C 9/004* (2006.01)
*G21C 13/02* (2006.01)

(52) U.S. Cl.
CPC .. *B01D 2053/222* (2013.01); *B01D 2053/224* (2013.01); *G21C 9/004* (2013.01); *G21C 13/022* (2013.01)

(56) References Cited

U.S. PATENT DOCUMENTS

| | | | | |
|---|---|---|---|---|
| 2016/0102177 | A1* | 4/2016 | Ghanem | C08G 73/1075 95/55 |
| 2018/0353898 | A1* | 12/2018 | Hamad | B01D 53/1456 |
| 2019/0062504 | A1 | 2/2019 | Ghanem et al. | |
| 2020/0086266 | A1* | 3/2020 | Suzuki | B01D 53/1425 |
| 2025/0163219 | A1* | 5/2025 | Abdulhamid | B01D 69/02 |

OTHER PUBLICATIONS

Japanese Office Action received in corresponding Japanese Application No. 2024-000315 dated Jun. 25, 2024.

International Search Report and Written Opinion of the International Searching Authority of PCT/JP2021/021705 dated Aug. 31, 2021.

* cited by examiner

FILTER FOR REMOVING RADIOACTIVE NOBLE GAS, FILTER UNIT AND REACTOR CONTAINMENT VENT SYSTEM

TECHNICAL FIELD

The present invention relates to a radioactive noble gas removal filter for removing radioactive noble gas, a filter unit including the same, and a nuclear reactor containment vessel vent system.

BACKGROUND ART

One of the functions of the nuclear reactor containment vessel installed in a nuclear power plant is that in the unlikely event that a meltdown (hereinafter referred to as a severe accident) occurs in the core placed in the nuclear reactor pressure vessel to release radioactive materials outside the nuclear reactor pressure vessel, the radioactive materials are confined in the nuclear reactor containment vessel to prevent them from leaking outside. Even if a severe accident occurs, if sufficient water is injected afterward and the nuclear reactor containment vessel is cooled, the accident will be resolved.

However, in the unlikely event that steam production continues and the cooling of the nuclear reactor containment vessel is insufficient, the nuclear reactor containment vessel will be pressurized. When the nuclear reactor containment vessel is pressurized, the gas in the nuclear reactor containment vessel can be vented to the atmosphere to depressurize the nuclear reactor containment vessel. This operation is called a vent operation. When performing this venting operation, in boiling water reactors, radioactive materials are removed using the pool water of the suppression pool, and the gas in the nuclear reactor containment vessel (hereinafter referred to as "vent gas") is released to the atmosphere so as to minimize the exposure of the public.

In addition, there is a nuclear reactor containment vessel vent system as a system for further removing radioactive materials from this vent gas. Patent Literature 1 describes an example of nuclear reactor containment vessel vent systems.

The nuclear reactor containment vessel vent system described in Patent Literature 1 includes a vent line that discharges the gas inside the nuclear reactor containment vessel to the outside to decompress the nuclear reactor containment vessel. The vent system also includes a filter that is located on the end portion of the vent line on the side of the nuclear reactor containment vessel, impermeable to radioactive materials and permeable to steam, and a protective vessel that surrounds the end portion of the vent line and the filter inside the nuclear reactor containment vessel. This vent system further includes an on-off valve for bypass of the vent line installed in the protective container that opens at an operating pressure equal to or lower than the critical pressure of the nuclear reactor containment vessel and closes at a pressure lower than the operating pressure to discharge gas to the outside without passing through the filter, and an activation valve that is installed in the protective container and opened at an operating pressure equal to or lower than the operation pressure of the bypass on-off valve.

In this vent system, the vent gas is scrubbed with water in the suppression pool to remove particulate radioactive materials. In addition, particulate radioactive materials that have not been completely removed by scrubbing are further removed by a metal filter. In addition, gaseous radioactive materials such as iodine are removed through an iodine filter by chemical reaction and adsorption. Radioactive noble gases (such as radioactive isotope gases of krypton and radioactive isotope gases of xenon) are then removed using a membrane filter that is permeable to water vapor but impermeable to noble gases. Patent Literature 1 states that a polymer film containing polyimide as a main component (hereinafter referred to as a "polyimide film") is suitable as such a membrane filter.

CITATION LIST

Patent Literature

Patent Literature 1: JP2018-179693A

SUMMARY OF INVENTION

Technical Problem

A nuclear reactor containment vessel vent system aimed at removing radioactive noble gases using a membrane filter removes the radioactive noble gases by installing a membrane filter permeable to water vapor but impermeable to noble gases on the vent line through which the vent gas passes, as in Patent Literature 1. The amount of water vapor and noble gas that permeate the membrane filter is determined by the membrane area, the partial pressure difference between the gases across the membrane filter, and the permeability of the membrane filter to each gas.

A polyimide film has a characteristic that it has excellent heat resistance and has a dense structure, and thus has a lower noble gas permeability than the water vapor permeability, and can selectively release water vapor to the outside. However, a polyimide film is generally obtained by dehydration condensation of two kinds of raw materials, an acid dianhydride and a diamine, to produce the polyimide constituting the film material, so that there is a possibility that hydrolysis reaction by water molecules is reversibly induced.

In particular, polyimide, which is used for membranes that separate water vapor generated in the event of an accident, is likely to be exposed to relatively high temperature water vapor (for example, high temperature water vapor of 150° C. to 180° C.) and thus hydrolysis may occur. A filter unit including a membrane filter is required to have durability for a long period of time, and for that reason, it is necessary to suppress the occurrence of hydrolysis as much as possible.

The present invention has been made in view of the above circumstances, and an object thereof is to provide a radioactive noble gas removal filter, a filter unit, and a nuclear reactor containment vessel vent system with improved durability.

Solution to Problem

A radioactive noble gas removal filter according to the present invention, which has solved the above issues, includes a polyimide film including a structural unit represented by the general formula (1).

[Chem. 1]

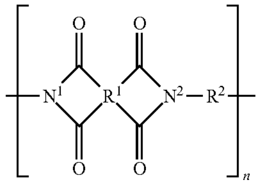

(1)

Note that in the general formula (1), the $N^1$ and the $N^2$ each represent nitrogen, the $R^1$ comprises one or more first aromatic rings, the $R^1$ and the $N^1$ form a first imide ring the $R^1$ and the $N^2$ form a second imide ring, a first steric structure of the one or more first aromatic rings, a second steric structure of the first imide ring, and a third steric structure of the second imide ring are not disposed on a plane and make a bent configuration, the $R^2$ comprises one or more second aromatic rings comprising an aromatic ring bonded to the $N^2$, the aromatic ring comprises a first carbon atom bonded to the $N^2$, the aromatic ring comprises a second carbon atom and a third carbon atom (ortho position carbon atoms) respectively at positions neighboring to the first carbon atom, at least one of the second carbon atom and the third carbon atom has a substituent, a fourth steric structure of the second imide ring (an imide structure) to which the $R^2$ is bonded and a fifth steric structure of the aromatic ring to which the $N^2$ is bonded are not disposed on a same plane, and n represents an integer of one or greater.

Advantageous Effects of Invention

The present invention makes it possible to provide a radioactive noble gas removal filter, a filter unit, and a nuclear reactor containment vessel vent system with improved durability. Issues, configurations, and effects other than those described above will be clarified by the following description of embodiments.

DESCRIPTION OF EMBODIMENTS

Hereinafter, an embodiment of a radioactive noble gas removal filter (hereinafter sometimes simply referred to as "filter"), a filter unit, and a nuclear reactor containment vessel vent system according to the present invention will be described in detail with reference to the drawings as appropriate. The filter according to the present embodiment is particularly suitably used for selectively removing radioactive noble gases in a filter unit and a nuclear reactor containment vessel vent system. These filter, filter unit, and nuclear reactor containment vessel vent system are all used in a nuclear power plant to depressurize the nuclear reactor containment vessel by venting the gas in the nuclear reactor containment vessel to the atmosphere in the unlikely event of a severe accident. The filter and filter unit are disposed on the vent line (vent pipe) of the nuclear reactor containment vessel vent system. First, a nuclear power plant and a nuclear reactor containment vessel vent system where the filter is used will be described, and then the filter unit and filter will be described.

[Nuclear Power Plant and Nuclear Reactor Containment Vessel Vent System]

Figure 1:
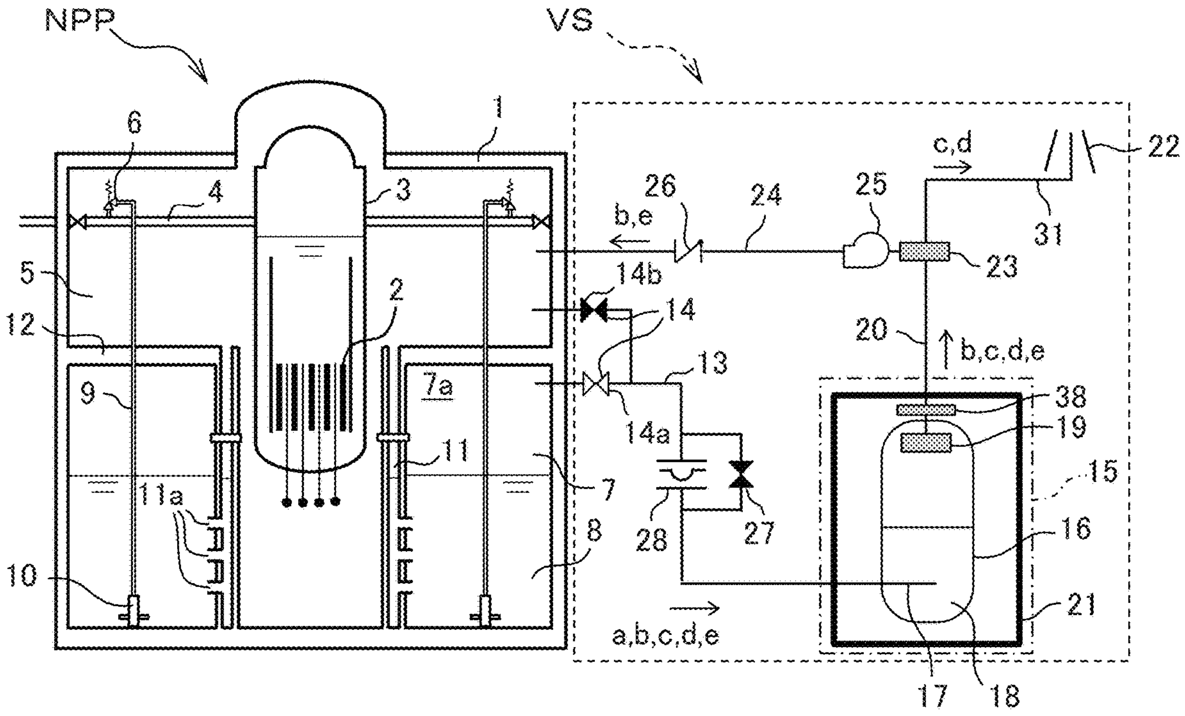
FIG. 1 is a schematic configuration diagram showing the configuration of a nuclear power plant including a nuclear reactor containment vessel vent system according to the present embodiment.

Among the drawings referenced, FIG. 1 is a schematic configuration diagram showing the configuration of a nuclear power plant NPP including a nuclear reactor containment vessel vent system VS according to the present embodiment. Note that FIG. 1 shows an advanced boiling water reactor (ABWR) including a nuclear reactor containment vessel vent system VS.

As shown in FIG. 1, the nuclear power plant NPP has a nuclear reactor pressure vessel 3 containing a core 2 inside a nuclear reactor containment vessel 1. The nuclear reactor pressure vessel 3 includes a main steam pipe 4 connected thereto to send steam generated in the nuclear reactor pressure vessel 3 to a turbine (not shown).

The interior of the nuclear reactor containment vessel 1 is partitioned into a dry well 5 and a wet well 7 by a diaphragm floor 12 made of reinforced concrete. The wet well 7 has a space inside which pool water is stored. A pool in this wet well 7 is called a suppression pool 8. The dry well 5 and wet well 7 are communicated with each other via a vent pipe 11 having vent pipe exhaust portions 11*a*. Each vent pipe exhaust portion 11*a* opens below the water surface of the suppression pool 8 in the wet well 7.

In the unlikely event of a pipe rupture accident where some of the pipes are damaged to release steam into the nuclear reactor containment vessel 1, the pressure in the dry well 5 will rise due to the steam flowing out of the rupture opening of the pipes. Note that this pipe rupture accident is generally known by the name of LOCA, and could occur in the dry well 5 through which the pipes pass. In that case, due to the pressure difference between the dry well 5 and the wet well 7, the steam released into the dry well 5 is led through the vent pipe 11 and the vent pipe exhaust portions 11*a* to the pool water in the suppression pool 8 in the wet well 7. The suppression pool 8 condenses the steam with pool water to significantly reduce the volume of the steam, thereby suppressing pressure rise in the nuclear reactor containment vessel 1. Here, if radioactive materials are contained in the steam, most of the radioactive materials are removed by the scrubbing effects of the pool water in the suppression pool 8.

In addition, also when the pressure in the nuclear reactor pressure vessel 3 or the main steam pipe 4 rises, the steam is similarly released to the suppression pool 8, which condenses it and thereby lowers the pressure in the nuclear reactor pressure vessel 3 and the main steam pipe 4. As a device for this purpose, for example, in an ABWR, a steam release safety valve 6 for releasing steam is installed in the space of the dry well 5 in the nuclear reactor containment vessel 1, for example, at a given location in the main steam pipe 4. The steam released through the steam release safety valve 6 passes through a steam release safety valve exhaust pipe 9 and is finally released from a quencher 10 into the suppression pool 8 and is condensed by the pool water of the suppression pool 8. Then, as described above, the suppression pool 8 condenses the steam into liquid water to greatly reduce the volume of the steam, thereby suppressing pressure rise in the nuclear reactor containment vessel 1. Also here, if radioactive materials are contained in the steam, most of the radioactive materials are removed by the scrubbing effects of the pool water in the suppression pool 8 in the same manner as described above.

By condensing steam in the suppression pool 8 and cooling the pool water in the suppression pool 8 with a residual heat removal system (not shown), it is possible to prevent temperature rise and pressure rise in the nuclear reactor containment vessel 1 and settle the accident.

However, in the unlikely event that the residual heat removal system fails to function, the temperature of the pool water in the suppression pool 8 will rise. As the temperature of the pool water rises, the partial pressure of the steam in the nuclear reactor containment vessel 1 rises to the saturated vapor pressure for the temperature of the pool water, so that the pressure in the nuclear reactor containment vessel 1 rises. When such a pressure rise occurs, the pressure rise can be suppressed by spraying cooling water into the nuclear reactor containment vessel 1. In addition, this spray can also be operated by connecting a fire pump or the like from the outside.

However, in the further unlikely event that this spray also fails to work, the pressure in the nuclear reactor containment vessel 1 will rise. When such a pressure rise occurs in the nuclear reactor containment vessel 1, the gas inside the nuclear reactor containment vessel 1 can be released to the outside to suppress the pressure rise in the nuclear reactor containment vessel 1. This operation is called a vent operation. In an ABWR, this vent operation is performed by releasing the gas 7*a* in the wet well 7. This makes it possible for the ABWR to release gas to the outside after removing as much radioactive material as possible with the pool water in the suppression pool 8.

The ABWR has the above-described nuclear reactor containment vessel vent system VS as a device for further removing radioactive materials from the gas 7*a* to be released to the outside in performing this vent operation. The nuclear reactor containment vessel vent system VS includes a vent line 13 connected to the dry well 5 and the wet well 7 of the nuclear reactor containment vessel 1. The vent line 13 includes isolation valves 14, a filter vent device activation valve 27, and a rupture disk 28 bypassing the filter vent device activation valve 27. Normally, the isolation valve 14*a* on the wet well 7 side is always open (in FIG. 1, the isolation valve 14*a* in the open state is shown in white), and the isolation valve 14*b* on the dry well 5 side is always closed (in FIG. 1, the isolation valve 14*b* in the closed state is shown in black). The filter vent device activation valve 27 is normally left closed (in FIG. 1, the filter vent device activation valve 27 in the closed state is shown in black), but opens in the case of a predetermined pressure or higher, and once opened, it remains open until an instruction (signal) to close it again. By keeping the isolation valve 14*a* on the wet well 7 side open in this way, the pool water in the suppression pool 8 can scrub the released gas and remove most of the radioactive materials. This is a safety feature of ABWR.

The rupture disk 28 is set to passively open at a pressure equal to or higher than the pressure that activates the filter vent device activation valve 27 and equal to or lower than the resistance pressure of the nuclear reactor containment vessel 1. The rupture disk 28 passively opens under the above conditions when the filter vent device activation valve 27 fails to open for some reason, so that the nuclear reactor containment vessel 1 can be appropriately decompressed. Note that the rupture disk 28 may be an explosion valve or other valve.

In addition, the vent line 13 is connected to the inlet pipe 17 of the filter container 16 in the filter vent device 15 constituted by the equipment within the dashed-dotted lines. The tip side of the inlet pipe 17 is open inward the filter container 16.

Pool water 18 for scrubbing is stored in the lower portion of the filter container 16. A metal filter 19 in the form of a metal screen is installed on the upper side of the filter container 16. To this metal filter 19, one end of an outlet pipe 20 of the filter container 16 is connected. The other end of the outlet pipe 20 passes through the shielding wall 21 and is led out of the shielding wall 21. The gas finally passes through a pipe 31 leading to the exhaust stack 22 and is released from the exhaust stack 22 to the outside.

The released gas entering the filter vent device 15 in the vent line 13 includes aerosol-like radioactive materials a, radioactive noble gases b, water vapor c, hydrogen d, other gases e such as nitrogen, and the like. The released gas that has entered the filter vent device 15 is further scrubbed with pool water 18 for scrubbing, thereby mainly removing most of the aerosol-like radioactive materials a. Furthermore, the metal filter 19 and the iodine filter 38 remove gaseous radioactive materials such as iodine (not shown).

Most of the radioactive materials are removed by the above operation, but the radioactive noble gas b has poor reactivity, so that it cannot be removed only by the filter vent device 15 having the configuration described so far. Note that the released gas in the outlet pipe 20 released from the filter vent device 15 having the configuration described so far contains radioactive noble gases b, water vapor c, hydrogen d, other gases e such as nitrogen, and the like.

[Filter Unit]

In view of the above, in the nuclear reactor containment vessel vent system VS according to the present embodiment, a filter unit 23 is installed on the outlet pipe 20 downstream of the filter vent device 15. The filter unit 23 includes a later-described filter (such as a hollow fiber membrane 23*a* or a membrane filter 23*h* to be described later) and a holding member configured to hold this filter (such as a cylindrical body 23*c* and an end member 23*d* to be described later), and can selectively remove radioactive noble gases. That is, the filter unit 23 includes the later-described filter, so that it is impermeable to radioactive noble gases but permeable to water vapor and hydrogen. Therefore, the filter unit 23 can release water vapor and hydrogen to the outside to lower the pressure in the nuclear reactor containment vessel 1.

Figure 2:
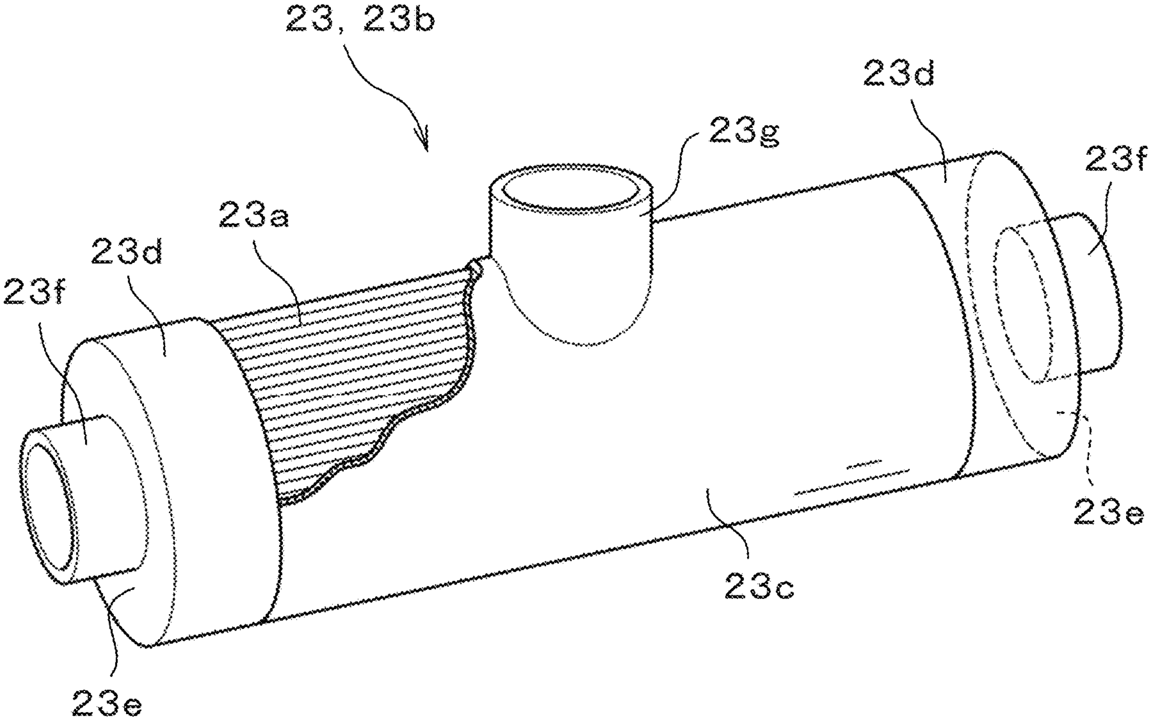
FIG. 2 is a partially cutaway perspective view showing an aspect of the filter unit according to the present embodiment.

FIG. 2 is a partially cutaway perspective view showing an aspect of the filter unit 23 according to the present embodiment. As shown in FIG. 2, an example of the filter unit 23 is a hollow fiber membrane module 23*b* where a later-described filter is formed in a straw-shaped hollow fiber membrane 23*a* and included therein. The hollow fiber membrane module 23*b* includes a hollow fiber membrane 23*a* and, as holding members configured to hold the same, a cylindrical body 23*c* and bottomed cylindrical end members 23*d* at both ends of the cylindrical body 23*c*. At the center of the bottom portion 23*e* of each end member 23*d*, there is provided a released gas inlet/outlet portion 23*f* for allowing the released gas to enter and exit. Multiple hollow fiber membranes 23*a* are arranged in bundles in the hollow fiber membrane module 23*b*. The vicinity of the openings (not shown) at both ends of the hollow fiber membrane 23*a* is fixed with a fixing material such as resin so as not to block the opening of each hollow fiber membrane 23*a* and to fill the gaps between the multiple hollow fiber membranes 23*a* and the gaps with the cylindrical body 23*c*. In addition, the opening (not shown) at the end of the hollow fiber membrane 23*a* is provided so as to face the release gas inlet/outlet portion 24*f*.

The released gas enters from one opening of the hollow fiber membrane 23*a*, flows through the inside of the hollow fiber membrane 23*a*, and is discharged from the other opening. Here, the water vapor c and hydrogen d contained in the released gas permeate from the membrane surface of the hollow fiber membrane 23*a* to the outside of the hollow fiber membrane 23*a*. On the other hand, the radioactive noble gases b and other gases e contained in the released gas are discharged from the other opening of the hollow fiber membrane 23*a* without permeating through the membrane surface of the hollow fiber membrane 23*a*, and discharged through the released gas inlet/outlet portion 23*f* of the end member 23*d* to a return pipe 24. The released gas (radioactive noble gases b and other gases e) discharged to the return pipe 24 is returned through a check valve 26 to the dry well 5. On the other hand, the cylindrical body 23*c* includes a flow port 23*g* at a given location thereof, and the water vapor c and hydrogen d that have permeated through the membrane surfaces of the hollow fiber membranes 23*a* are discharged from the flow port 23*g* into the pipe 31, pass through the pipe 31, and are discharged from the exhaust stack 22 to the outside.

Note that although the filter unit 23 can remove radioactive noble gases at any position inside the nuclear reactor containment vessel 1 or on the vent pipe, it is preferably placed downstream of the filter vent device 15. In this way, it is possible to prevent the aerosol-like radioactive materials a from adhering to the filter unit 23 which would result in degrading the filter performance, and from being exposed to the influence of molten fuel that may occur in the event of an accident. Therefore, the reliability of the nuclear reactor containment vessel vent system VS is improved.

The hollow fiber membrane 23*a* used in the filter unit 23 is permeable to water vapor c and hydrogen d, but impermeable to radioactive noble gases b. That is, the filter unit 23 can release the water vapor c and hydrogen d that cause the pressurization of the nuclear reactor containment vessel 1 while removing the radioactive noble gases b. However, as time passes, the filter unit 23 accumulates impermeable radioactive noble gases b, and as the partial pressures of these gases increase, the permeation amounts of water vapor c and hydrogen d decrease, so that the function of lowering the pressure in the nuclear reactor containment vessel 1 decreases. Therefore, the filter unit 23 and the nuclear reactor containment vessel 1 are connected by the return pipe 24, and a blower 25 installed on the line of the return pipe 24 returns the gases impermeable to the hollow fiber membranes 23*a* to the nuclear reactor containment vessel 1. In this way, the nuclear reactor containment vessel vent system VS can maintain the vapor permeation performance of the filter unit 23. In addition, the nuclear reactor containment vessel vent system VS includes the check valve 26 on the line of the return pipe 24, so that it is possible to prevent gas containing radioactive materials from flowing back from the nuclear reactor containment vessel 1 to the filter unit 23 without passing through the filter vent device 15.

[Radioactive Noble Gas Removal Filter]

Figure 3:
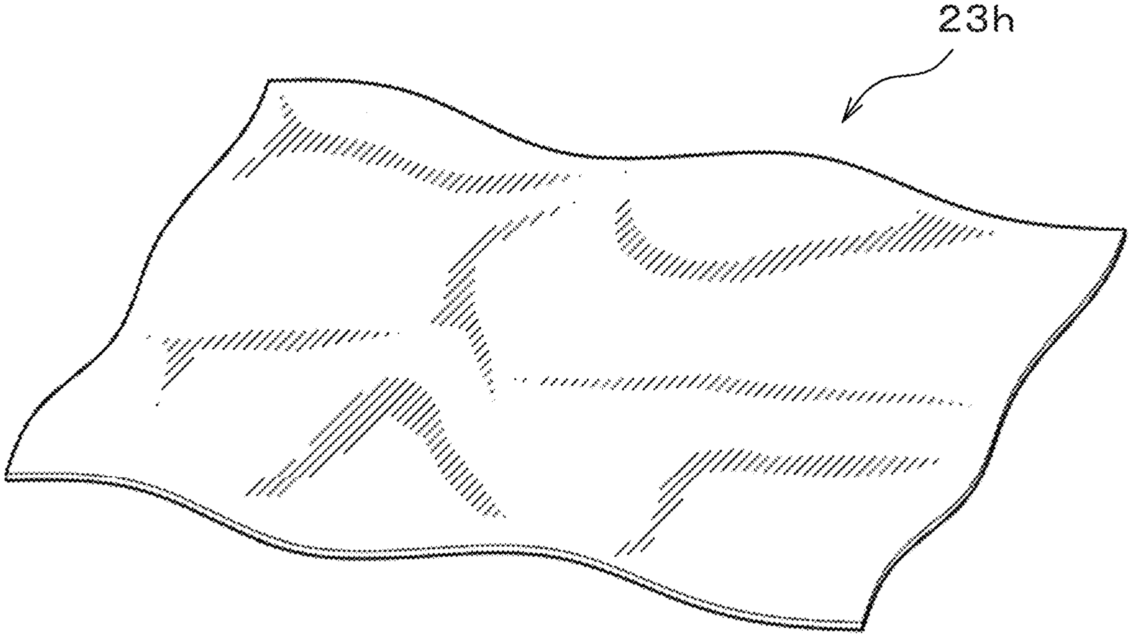
FIG. 3 is a perspective view showing an aspect of the filter according to present embodiment.

A filter used in the filter unit 23 includes a polyimide film including a structural unit represented by the general formula (1). Note that besides the hollow fiber membrane 23*a*, this filter can be formed as a sheet-shaped membrane filter 23*h* as shown in FIG. 3. FIG. 3 is a perspective view showing an aspect of the filter according to the present embodiment.

[Chem. 2]

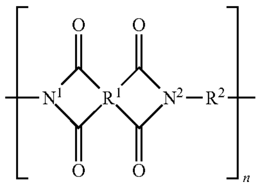

(1)

Here, in the general formula (1), the $N^1$ and the $N^2$ each represent nitrogen. Therefore, as shown in the general formula (1), the structural unit of the filter has an imide structure containing the $N^1$ (first imide ring) and an imide structure containing the $N^2$ (second imide ring). Hereinafter, when there is no need to distinguish between the first imide ring and the second imide ring, they are simply referred to as imide rings.

In addition, the $R^1$ includes one or more aromatic rings, the $R^1$ and the $N^1$ form a first imide ring the $R^1$ and the $N^2$ form a second imide ring, and a steric structure of the one or more aromatic rings, a steric structure of the first imide ring, and a steric structure of the second imide ring are not disposed on a plane and make a bent configuration. For example, a carbon that makes a single bond has four $sp^3$ hybrid orbitals. These four $sp^3$ hybrid orbitals are arranged so as to face the vertices of a regular tetrahedron. Therefore, the skeleton of a molecule centered on carbon bonds to other atoms (such as hydrogen and carbon) at a bond angle of 109.5° in the case of a single bond. Further, as for nitrogen, single bond takes the form of a triangular pyramid with the nitrogen at the vertex, and the bond angle with other atoms is about 107°. Therefore, as described above, the steric structure of the one or more first aromatic rings, the steric structure of the first imide ring, and the steric structure of the second imide ring are not disposed on a plane and make a bent configuration.

In addition, the $R^2$ includes one or more aromatic rings including an aromatic ring bonded to the $N^2$, the aromatic ring includes a first carbon atom bonded to the $N^2$, the aromatic ring includes a second carbon atom and a third carbon atom (ortho position carbon atoms) respectively at positions neighboring to the first carbon atom, at least one of the second carbon atom and the third carbon atom has a substituent.

Further, a steric structure of the second imide ring to which the $R^2$ is bonded and a steric structure of the aromatic ring to which the $N^2$ is bonded are not disposed on a same plane. As described above, as for nitrogen, single bond takes the form of a triangular pyramid with the nitrogen at the vertex, and the bond angle with other atoms is about 107°. Therefore, if $N^2$ and $R^2$ are bonded by a single bond, a steric structure of the imide and a steric structure of the aromatic ring are not disposed on a same plane. Additionally, n represents an integer of one or more. Note that the aromatic rings in the general formula (1) are preferably benzene or naphthalene.

The polyimide film including a structural unit represented by the general formula (1) can be obtained, for example, as a polymer by dehydration condensation of an acid dianhydride represented by the general formula (2) and a diamine represented by the general formula (3).

[Chem. 3]

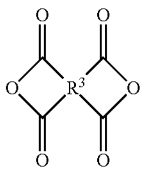

(2)

Note that in the general formula (2), the $R^3$ includes one or more aromatic rings. When the $R^3$ includes multiple aromatic rings, steric structures of those aromatic rings are not disposed on a plane and make a bent configuration. $R^3$ in this the general formula (2) corresponds to $R^1$ in the general formula (1).

[Chem. 4]

$$H_2N—R^4—NH_2 \quad (3)$$

Note that in the general formula (3), the $R^4$ includes one or more aromatic rings, the one or more aromatic rings includes fourth carbon atoms each bonded to an amino group, there are a fifth carbon atom and a sixth carbon atom respectively at positions neighboring to each of the fourth carbon atoms, and at least one of the fifth carbon atom and the sixth carbon atom has a substituent. $R^4$ in this the general formula (3) corresponds to $R^2$ in the general formula (1).

Here, in the conventional polyimide film, the imide rings constituting it are hydrolyzed by relatively high-temperature water vapor to form polyamic acid, which is further decomposed into carboxylic acid and amine. This reduces the tensile elongation at break of the material and makes it brittle. This hydrolysis reaction is thought to occur when electrons of $OH^-$ contained in high-temperature water molecules enter electron orbits possessed by the imide rings. The hydrolysis reactivity here is determined by the energy difference (gap) between the electron unoccupied orbital energy level spreading around the imide rings and the highest occupied molecular orbital (HOMO) energy of $OH^-$. In other words, the hydrolysis reactivity here can be quantitatively evaluated by obtaining these energies. When the energy difference is large, it means that it is easier to stabilize by reaction, so that it can be judged that the hydrolysis reaction proceeds easily.

On the other hand, it is thought that as the energy level of the unoccupied electron orbital spreading around the imide rings increases in accordance with the combination of the acid dianhydride and the diamine, the energy difference between the unoccupied orbital energy levels of electrons spreading around the imide rings and the HOMO energy of $OH^-$ decreases. Therefore, it is considered that the hydrolysis reactivity is lowered and a molecular structure satisfying the desired performance is obtained.

The unoccupied orbital energy level of the structure located on the imide rings can be obtained, for example, by simulation as follows.

(1) For a combination of an acid dianhydride and a diamine, a low molecular weight chain model is created that is formed of three consecutive structural units represented by the general formula (1).

(2) For the created low molecular weight chain model, a steric dimensional structure is created that realizes general interatomic distances, bond angles, and dihedral angles. Then, an appropriate dihedral angle is selected so that there is no molecular overlap or intersection, and the angle is changed to generate up to 100 structural isomers different from the initial one.

(3) Each structure obtained is used as an initial value to compute the closest energy stabilization structure and calculate the energy. This calculation/computation is obtained, for example, by using DFTB (Density Functional based Tight-Binding) from SCM and performing structural optimization calculation using DFTB. org/3ob-3-1 parameters.

(4) The energy of each structure obtained is compared, and the structure with the minimum energy is defined as the most stable structure, and energy calculation is performed by the density functional theory considering dispersion terms to compute the energy level of the entire molecule. This computation is obtained, for example, by using Gaussian 09 from Gaussian, using APFD as the functional and 6-31G(d, p) as the basis function.

(5) Among the obtained energy levels, the orbital when the energy level of the unoccupied orbital has an isosurface value of 0.01 in ascending order is calculated, and if the orbital spreads directly above either of the two central imide rings among the three repeating structures, the energy value is recorded. If the lowest unoccupied orbital does not correspond to an imide ring, the unoccupied orbital of one higher energy level is similarly calculated. This operation is performed until an orbital extending around the target imide ring is found.

(6) The energy levels of the unoccupied orbitals thus obtained are compared for combinations of acid dianhydrides and diamines, and it is judged that the higher the energy level, the lower the hydrolyzability.

As for the height and reactivity of the energy levels of the unoccupied electron orbitals spreading around the imide rings, examples of the generally known BPDA-PPD (3,3',4,4'-biphenyltetracarboxylic dianhydride-p-phenylenediamine) represented by the chemical formula (4) and PMDA-ODA (pyromellitic dianhydride-oxydianiline) represented by the chemical formula (5) will be given.

[Chem. 5]

(4)

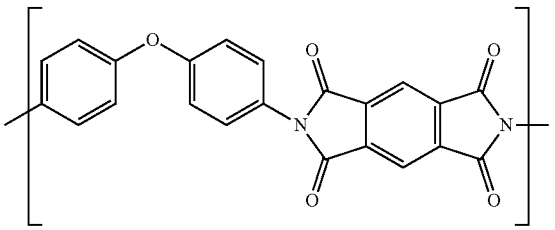

[Chem. 6]

(5)

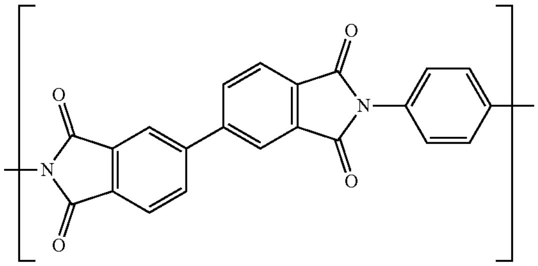

The unoccupied orbital energy levels of electrons spreading around the imide rings were −68.33521 kcal/mol for BPDA-PPD represented by the chemical formula (4), and −79.65298 kcal/mol for PMDA-ODA represented by the chemical formula (5). From this, it is considered that BPDA-PPD represented by the chemical formula (4) is less likely to be hydrolyzed than PMDA-ODA represented by the chemical formula (5). In fact, the results of investigating deterioration resistance under basic conditions have been reported (NASA Technical Memorandum 102726). In the report, the tensile strength of BPDA-PPD represented by the chemical formula (4) only decreased to about 85% in a severe test of immersion in a basic solvent of pH 11 to 14 at room temperature for 48 hours. On the other hand, PMDA-ODA represented by the chemical formula (5) showed that the tensile strength decreased to 60% at pH 11 and decomposed at pH 14. The results of this severe test show that the decomposability is higher by basicity, that is, by $OH^-$ than by water, and it is considered that the same trend will be observed in a severe test under superheated water vapor conditions. Therefore, in order to suppress hydrolysis by relatively high-temperature water vapor and improve durability, it would be preferable to provide a structure where electrons spreading around the imide rings have high unoccupied orbital energy levels.

Based on the above considerations, the present inventors diligently studied a structure where the unoccupied orbital energy levels of electrons spreading around the imide rings are high. As a result, the present inventors have found that the energy levels increase when the planar structure of the imide rings and the planar structure of the aromatic rings bonded with the amino groups on the diamine side are not disposed on a same plane and make a twisted configuration.

In addition, the present inventors have found in the above studies that the structure of an acid dianhydride has low planarity, and when it has a structure with wide electron orbits and no conjugated structure, the unoccupied orbital energy levels of electrons spreading around the imide rings are high. From this point of view, in the general formula (1), it can be said that it is preferable that the $R^1$ comprises two or more first aromatic rings, and a first aromatic ring and a first aromatic ring are bonded together by at least one selected from the group consisting of $sp^3$ carbon, a sulfonyl group, a ketone bond, and an ether bond. In this case, if the first aromatic ring and the first aromatic ring in $R^1$ are bonded with any of these, the structure of the acid dianhydride more reliably has low planarity, making it possible to obtain a structure with wide electron orbits and no conjugated structure. Then, the acid dianhydride for obtaining this is the compound represented by the above the general formula (2), and specific examples thereof include the compounds represented by the chemical formulas (6) to (8).

[Chem. 7]

(6)

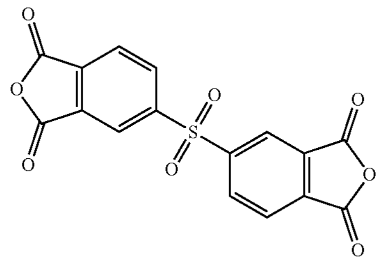

-continued

[Chem. 8]

(7)

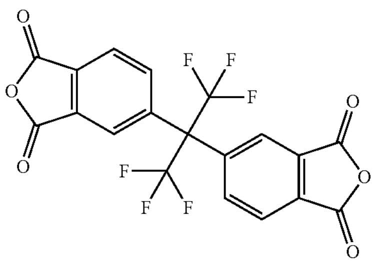

[Chem. 9]

(8)

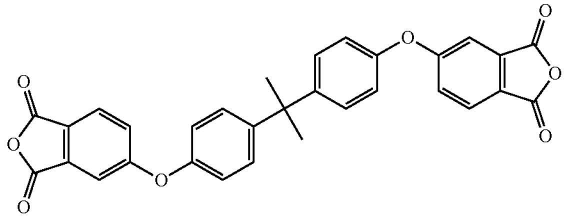

Furthermore, the present inventors have found in the above studies that a diamine takes a twisted structure when there is a substituent other than a hydrogen atom at C at the position neighboring to C in the aromatic ring bonded with an amino group (that is, ortho position). It can be said that it is preferable that the substituent is at least one selected from the group consisting of an alkyl group having a molecular weight of a methyl group or higher, a halogen-substituted alkyl group where at least one hydrogen atom in an alkyl group is substituted with a halogen element, and a halogen element. Moreover, as a substituent, for example, a sulfo group, a ketone group, a hydroxyl group, an amine, or the like can be used. With these substituents, the diamine can more reliably have a twisted structure. Examples of halogen elements include fluorine, chlorine, bromine, iodine, astatine, and tennessine. Further, from the viewpoint of forming the diamine into a twisted structure, in the general formula (1), it is preferable that the $R^2$ includes a first aromatic ring bonded to the $N^2$ and a second aromatic ring bonded to the first aromatic ring via a bonding group, the first aromatic ring includes a first carbon atom bonded to the $N^2$, and the bonding group is bonded to a second carbon atom at a position neighboring to the first carbon atom. Also, it is preferable that the bonding group is at least one selected from the group consisting of C, S, and O. In this way, it is possible to more reliably form the diamine into a twisted structure. The diamine for obtaining this is the compound represented by the general formula (3), and specific examples thereof include the compounds represented by the chemical formulas (9) to (11).

[Chem. 10]

(9)

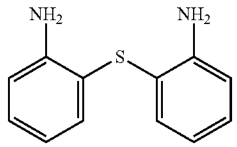

-continued

[Chem. 11]

(10)

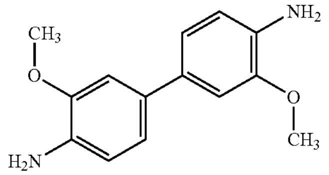

[Chem. 12]

(11)

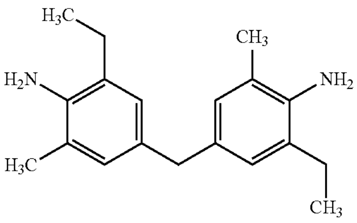

Note that in the diamine represented by the general formula (3), there are two carbon atoms bonded with amino groups, and each of these carbon atoms has two ortho position carbon atoms. In the present embodiment, only one of the carbon atoms may be ortho-positioned to the carbon atom bonded with an amino group. Examples of such diamines include the compound represented by the chemical formula (12).

[Chem. 13]

(12)

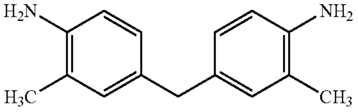

Even if the diamine represented by the general formula (3) has a highly planar structure, when it has any of the substituents described above, the unoccupied orbital energy levels of electrons spreading around the imide rings increase, contributing to stabilizing the structure of the entire polyimide film including the structural unit represented by the general formula (1) after polymerization. Examples of diamines having a highly planar structure and including any of the substituents described above include compounds represented by the chemical formulas (13) and (14).

[Chem. 14]

(13)

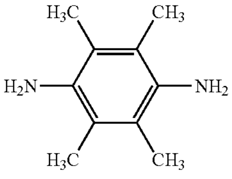

-continued

[Chem. 15]

(14)

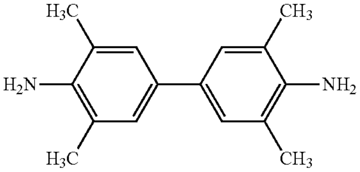

According to the film described above, it is considered that the unoccupied orbital energy levels of electrons spreading around the imide rings are high and the gap between the unoccupied orbital energy levels of electrons spreading around the imide rings and the HOMO energy of $OH^-$ is small. For this reason, the film according to the present embodiment has low hydrolysis reactivity and high durability even when it comes into contact with relatively high-temperature water vapor. Therefore, a filter unit using this film and a nuclear reactor containment vessel vent system using the filter unit also have high durability. Then, even in the unlikely event that gas containing radioactive materials flows out of the nuclear reactor pressure vessel into the nuclear reactor containment vessel to pressurize the nuclear reactor containment vessel, the use of the film according to the present embodiment makes it possible to remove all radioactive materials, including radioactive noble gases, when releasing the gas from the nuclear reactor containment vessel. Therefore, the film, filter unit, and nuclear reactor containment vessel vent system according to the present embodiment can prevent pressurization of the nuclear reactor containment vessel and minimize radioactive materials leaking to the outside.

EXAMPLES

In order to quantitatively compare hydrolysis resistance, a deterioration test was performed by immersing 13 types of polyimides described in the results of investigating deterioration resistance under basic conditions (NASA Technical Memorandum 102726) in a basic aqueous solution at room temperature for 2 days. Note that since Kapton and Apical are structurally the same, only Kapton was employed. Then, an estimation formula was created using the results of investigating changes in tensile strength.

The basic aqueous solution test at pH=11 was used as the test condition, and the value to be compared was the retention rate (%) of the tensile strength before and after deterioration. For polyimide, random forest regression prediction by scikit-learn was performed using the retention rate of tensile strength as the objective variable and nine explanatory variables calculated from the molecular structure. The nine explanatory variables are as follows.

1. Energy level of the unoccupied orbital described above
2 to 4. Hansen solubility parameters (δP, δD, δH) (for a structure with one repeating structure, excluding diamines and acid anhydrides appearing at the ends)
5. Cosine of the angle between the planes of imide ring and benzene ring attached to it
6. Number of aromatic rings (assuming three repeating structures)
7. Percentage of number of aromatic bonds among all interatomic bonds excluding hydrogen (assuming three repeating structures)

8. Number of rotatable bonds (assuming three repeating structures)
9. Ratio of $sp^3$ carbons to the total number of carbons (assuming three repeating structures)

Since there are 13 experimental datasets, seven of them were used as learning data and the remaining six were used as verification data. Prediction was performed with 1000 trees used for learning. A prediction model was used with a coefficient of determination of R2=0.90 for learning data and a coefficient of determination of R2=0.73 for verification data. As a result, it was predicted that a structure would be obtained with the tensile strength showing an average retention rate of 84% and a maximum retention rate of 92% for polyimides made from combinations of acid dianhydrides and diamines having the above characteristics, for example, combinations of acid dianhydrides of chemical formulas (6) to (8) and diamines of chemical formulas (9) to (14).

The radioactive noble gas removal filter, the filter unit, and the nuclear reactor containment vessel vent system according to the present invention have been described above in detail through embodiments and examples, but the gist of the present invention is not limited to this, and includes various modifications. For example, the above-described embodiments have been described in detail in order to explain the present invention in an easy-to-understand manner, and are not necessarily limited to those having all the described configurations. Also, some of the configurations of one embodiment can be replaced with the configuration of another embodiment, and the configuration of one embodiment can be added to the configuration of another embodiment. Moreover, it is possible to add, delete, or replace some of the configuration of each embodiment with those of another configuration.

REFERENCE SIGNS LIST

1 nuclear reactor containment vessel
13 vent line
23 filter unit
NPP nuclear power plant
VS nuclear reactor containment vessel vent system
a aerosol-like radioactive materials
b radioactive noble gases
c water vapor
d hydrogen
e other gases such as nitrogen

The invention claimed is:

1. A radioactive noble gas removal filter comprising a polyimide film comprising a structural unit represented by a first formula:

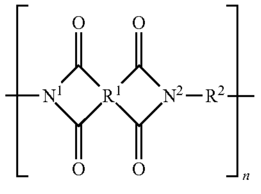

wherein, in the first formula,
the $N^1$ and the $N^2$ each represent nitrogen,
the $R^1$ comprises at least one first aromatic ring,
the $R^1$ and the $N^1$ form a first imide ring
the $R^1$ and the $N^2$ form a second imide ring,
a first steric structure of the at least one first aromatic ring, is disposed in a first plane, the first steric structure connecting a second steric structure of the first imide ring to a third steric structure of the second imide ring, wherein at least one of the second steric structure or the third steric structure is not coplanar with the first plane in which the first steric structure is disposed,
the $R^2$ comprises at least one second aromatic ring comprising an aromatic ring bonded to the $N^2$,
the at least one second aromatic ring to which the $N^2$ is bonded comprises a first carbon atom bonded to the $N^2$,
the at least one second aromatic ring to which the $N^2$ is bonded comprises a second carbon atom and a third carbon atom respectively at positions neighboring to the first carbon atom,
at least one of the second carbon atom and the third carbon atom has a substituent,
the third steric structure of the second imide ring to which the $R^2$ is bonded and a fourth steric structure of the at least one second aromatic ring to which the $N^2$ is bonded are not disposed on a same plane, and
n represents an integer of one or greater.

2. The radioactive noble gas removal filter according to claim 1, wherein the at least one first aromatic ring comprises two or more first aromatic rings, and
two of the two or more first aromatic rings are bonded together by at least one selected from the group consisting of $sp^3$ carbon, a sulfonyl group, a ketone bond, and an ether bond.

3. The radioactive noble gas removal filter according to claim 1, wherein the substituent is at least one selected from the group consisting of an alkyl group having a molecular weight of a methyl group or higher, a halogen-substituted alkyl group where at least one hydrogen atom in an alkyl group is substituted with a halogen element, and a halogen element.

4. The radioactive noble gas removal filter according to claim 1, wherein the $R^2$ comprises a first aromatic ring of the at least one first aromatic ring bonded to the $N^2$ and the at least one second aromatic ring bonded to the first aromatic ring via a bonding group,
the first aromatic ring bonded to the at least one second aromatic ring comprises the first carbon atom bonded to the $N^2$, and
the bonding group is bonded to the second carbon atom at a position neighboring to the first carbon atom.

5. The radioactive noble gas removal filter according to claim 4, wherein the bonding group is at least one selected from the group consisting of C, S, and O.

6. The radioactive noble gas removal filter according to claim 1, wherein the polyimide film comprising the structural unit represented by the first formula is a polymer of an acid dianhydride represented by a second formula and a diamine represented by a third formula, wherein the second formula is

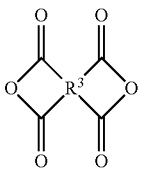

wherein, in the second formula, the $R^3$ comprises at least one third aromatic ring, and wherein the third formula is $$H_2N—R^4—NH_2$$

wherein, in the third formula, the $R^4$ comprises at least one fourth aromatic ring, the at least one fourth aromatic ring comprising one or more fourth carbon atoms, each bonded to an amino group, there are a fifth carbon atom and a sixth carbon atom respectively at positions neighboring to each of the one or more fourth carbon atoms, and at least one of the fifth carbon atom and the sixth carbon atom has a substituent.

7. The radioactive noble gas removal filter according to claim 1, wherein the radioactive noble gas removal filter is configured to be disposed on a vent line configured to vent gas in a nuclear reactor containment vessel to an outside to depressurize the nuclear reactor containment vessel.

8. A filter unit comprising:

the radioactive noble gas removal filter according to claim 1; and a holding member configured to hold the radioactive noble gas removal filter.

9. A nuclear reactor containment vessel vent system comprising:

a vent line configured to vent gas in a nuclear reactor containment vessel to an outside to depressurize the nuclear reactor containment vessel; and the filter unit according to claim 8 disposed at a part of the vent line.

10. A filter unit comprising:

the radioactive noble gas removal filter according to claim 2; and a holding member configured to hold the radioactive noble gas removal filter.

11. A filter unit comprising:

the radioactive noble gas removal filter according to claim 3; and a holding member configured to hold the radioactive noble gas removal filter.

12. A filter unit comprising:

the radioactive noble gas removal filter according to claim 4; and a holding member configured to hold the radioactive noble gas removal filter.

13. A filter unit comprising:

the radioactive noble gas removal filter according to claim 5; and a holding member configured to hold the radioactive noble gas removal filter.

14. A filter unit comprising:

the radioactive noble gas removal filter according to claim 6; and a holding member configured to hold the radioactive noble gas removal filter.

15. A filter unit comprising:

the radioactive noble gas removal filter according to claim 7; and a holding member configured to hold the radioactive noble gas removal filter.

16. A nuclear reactor containment vessel vent system comprising:

a vent line configured to vent gas in a nuclear reactor containment vessel to an outside to depressurize the nuclear reactor containment vessel; and the filter unit according to claim 10 disposed at a part of the vent line.

17. A nuclear reactor containment vessel vent system comprising:

a vent line configured to vent gas in a nuclear reactor containment vessel to an outside to depressurize the nuclear reactor containment vessel; and the filter unit according to claim 11 disposed at a part of the vent line.

18. A nuclear reactor containment vessel vent system comprising:

a vent line configured to vent gas in a nuclear reactor containment vessel to an outside to depressurize the nuclear reactor containment vessel; and the filter unit according to claim 12 disposed at a part of the vent line.

19. A nuclear reactor containment vessel vent system comprising:

a vent line configured to vent gas in a nuclear reactor containment vessel to an outside to depressurize the nuclear reactor containment vessel; and the filter unit according to claim 13 disposed at a part of the vent line.

20. A nuclear reactor containment vessel vent system comprising:

a vent line configured to vent gas in a nuclear reactor containment vessel to an outside to depressurize the nuclear reactor containment vessel; and the filter unit according to claim 14 disposed at a part of the vent line.

* * * * *